US009555854B2

(12) United States Patent
Bendel et al.

(10) Patent No.: US 9,555,854 B2
(45) Date of Patent: Jan. 31, 2017

(54) VEHICLE OPERABLE BY MOTOR AND BY MUSCULAR ENERGY

(71) Applicant: Robert Bosch GmbH, Stuttgart (DE)

(72) Inventors: Karl Bendel, Schwieberdingen (DE); Hans-Peter Dommsch, Lichtenau (DE); Katrin Martini, Ditzingen (DE); Gerd Dornhoefer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/784,540

(22) PCT Filed: Mar. 3, 2014

(86) PCT No.: PCT/EP2014/054038
§ 371 (c)(1),
(2) Date: Oct. 14, 2015

(87) PCT Pub. No.: WO2014/170062
PCT Pub. Date: Oct. 23, 2014

(65) Prior Publication Data
US 2016/0090151 A1   Mar. 31, 2016

(30) Foreign Application Priority Data
Apr. 15, 2013   (DE) .................. 10 2013 206 710

(51) Int. Cl.
*B62M 6/55* (2010.01)
*B62K 11/00* (2006.01)
(Continued)

(52) U.S. Cl.
CPC ............. *B62M 6/55* (2013.01); *B62K 11/00* (2013.01); *B62M 6/50* (2013.01); *B62M 9/06* (2013.01);
(Continued)

(58) Field of Classification Search
CPC ........ B62M 6/55; B62K 2204/00; F16H 15/42
See application file for complete search history.

(56) References Cited

U.S. PATENT DOCUMENTS

| 3,873,128 | A | * | 3/1975 | Dunder | ................ | B62M 11/12 |
|||||||280/236|
| 7,232,396 | B2 | * | 6/2007 | Reisch | ................ | F16H 15/42 |
|||||||475/214|

(Continued)

FOREIGN PATENT DOCUMENTS

| DE | 2245767 | 3/1974 |
|---|---|---|
| EP | 1855028 | 11/2007 |
| NL | 7304436 | 10/1973 |

OTHER PUBLICATIONS

International Search Report for PCT/EP2014/054038, issued on May 30, 2014.

*Primary Examiner* — Kevin Hurley
(74) *Attorney, Agent, or Firm* — Norton Rose Fulbright US LLP; Gerard Messina

(57) ABSTRACT

A vehicle is provided which is operable to motor power and/or pedal power, in particular an electric bicycle, which includes a crankshaft drive having a bottom bracket spindle, a chain ring, which outputs a drive torque for the vehicle to a chain, an electric drive, and a cone ring transmission for the continuous variation of a gear step ratio, the cone ring transmission and the electric drive being situated at the crankshaft drive, and the cone ring transmission being connected to the crankshaft drive and set up in such a way that a torque generated by the rider is transmitted to the chain ring.

12 Claims, 4 Drawing Sheets

(51) Int. Cl.
*B62M 6/50* (2010.01)
*B62M 9/06* (2006.01)
*B62M 23/02* (2010.01)
*F16H 15/42* (2006.01)

(52) U.S. Cl.
CPC ........... *B62M 23/02* (2013.01); *B62K 2204/00* (2013.01); *F16H 15/42* (2013.01)

(56) References Cited

U.S. PATENT DOCUMENTS

2005/0164825 A1* 7/2005 Reisch .................... F16H 15/42
476/52
2013/0143713 A1* 6/2013 Rohs ....................... F16H 15/42
476/1

* cited by examiner

VEHICLE OPERABLE BY MOTOR AND BY MUSCULAR ENERGY

FIELD OF THE INVENTION

The present invention relates to a vehicle which is operable by motor and/or muscular energy, in particular an electric bicycle, having a cone ring transmission.

BACKGROUND INFORMATION

Examples known from the related art are electric bicycles in various developments. There are electric bicycles in which the electric drive is situated in the region of the bottom bracket (center motor concept). A rear wheel is then driven via a chain. A gear shift mechanism, such as a derailleur gear, hub gear or the like, may be disposed on the rear wheel. It would be desirable to have additional, alternative systems, especially gear shift devices.

SUMMARY

The vehicle according to the present invention, which is operable using motor and/or muscular energy, in particular the electric bicycle, has the advantage of allowing an especially compact design of an electric drive and a gear shift device. It is particularly advantageous that the gear shift device allows a continuous variation of a gear ratio. An especially compact design is possible in the present invention. In addition, an especially satisfactory interplay between a pedal drive and an electric drive can be obtained by a continuous variation of a gear ratio, so that the present invention is particularly suitable for an electric bicycle. The gear ratio can easily be varied even under loading and a noise when changing the gear ratio is able to be avoided, in particular, so that a variation of the gear ratio according to the present invention is very quiet. In the present invention, this is achieved in that the vehicle has a crankshaft drive which includes a bottom bracket spindle, a chain ring, and an electric drive. In addition, the vehicle is equipped with a continuous cone ring transmission for a stepless variation of the gear ratio. The cone ring transmission is disposed at the crankshaft drive and linked to the crankshaft drive and set up to transmit a torque generated by the rider to the chain ring. The continuous cone ring transmission has the additional advantage of allowing shifting under load and a rider does not notice any abrupt gear shift changes. This results in an especially advantageous driving feel, in particular in combination with the electric drive, since its torque and rotational speed are likewise controllable in a continuous manner.

The cone ring transmission is preferably situated within a housing of the crankshaft drive in order to allow an especially compact design.

In addition, the vehicle preferably has a gear step, via which the electric drive is connected to the chain ring and drives the chain ring. A connection between the gear step and the chain ring may be implemented with the aid of a sleeve or the like, for instance. The sleeve is preferably supported via a freewheel at the bottom bracket spindle.

In addition, the vehicle preferably includes a planetary gearing, which is situated between a driven shaft of the cone ring transmission and the chain ring. It is especially preferred that the driven shaft of the cone ring transmission drives a sun gear of the planetary gearing. Moreover, a ring gear of the planetary gearing also has an external gearing, via which an output from the planetary gearing takes place, preferably to a toothed gear of the gear step between the electric drive and the chain ring.

According to one further preferred development of the present invention, a gear ratio of the cone ring transmission is variable by an actuator that the rider can actuate. The cone ring transmission includes an input cone, an output cone, and a cone ring situated between the two cones. The actuator actuates the position of the cone ring in order to thereby vary a gear ratio between the two cones in a continuous manner.

An especially compact design results if the bottom bracket spindle runs through one of the cones of the cone ring transmission, in particular through the output cone.

Moreover, it is preferred that the electric drive is situated within one of the cones. This, too, helps in achieving even smaller dimensions of the subassembly.

In addition, the vehicle preferably includes a control unit and a sensor for recording a force that is applied by the rider. A force value can be ascertained in this manner, the control unit being designed to control the electric drive of the vehicle on the basis of the detected force value. In addition or as an alternative, a torque applied by the rider also is able to be employed for controlling the electric drive.

The cone ring gear especially preferably includes a cone pretensioning mechanism which pretensions one of the cones in the axial direction of the cone. The sensor for acquiring a rider-applied force is situated on the cone pretensioning mechanism. In an especially preferred manner, the cone pretensioning mechanism has a sloping plane including a ball, or a cone system having a positive cone and a negative cone, or a pressure coupling system having two disks with pockets and balls, the balls sitting in the pockets between the two disks.

According to one further preferred specific development of the present invention, the cone ring transmission is situated above the bottom bracket spindle. Moreover, it is preferred that the electric motor is situated below the bottom bracket spindle.

It is especially preferred that the vehicle of the present invention is an electric bicycle, the use of the continuous cone ring transmission of the present invention making it possible to dispense with a gear shift device on a rear wheel of the bicycle. The placement both of the electric drive and the gear shift mechanism in the form of the cone ring transmission on the bottom bracket furthermore results in an especially low center of gravity of the electric bicycle, which has a positive effect on the handling characteristics of the electric bicycle.

DETAILED DESCRIPTION

An electric bicycle 1 according to a first preferred exemplary embodiment of the present invention will be described in detail in the following text with reference to FIGS. 1 and 2.

Figure 1:
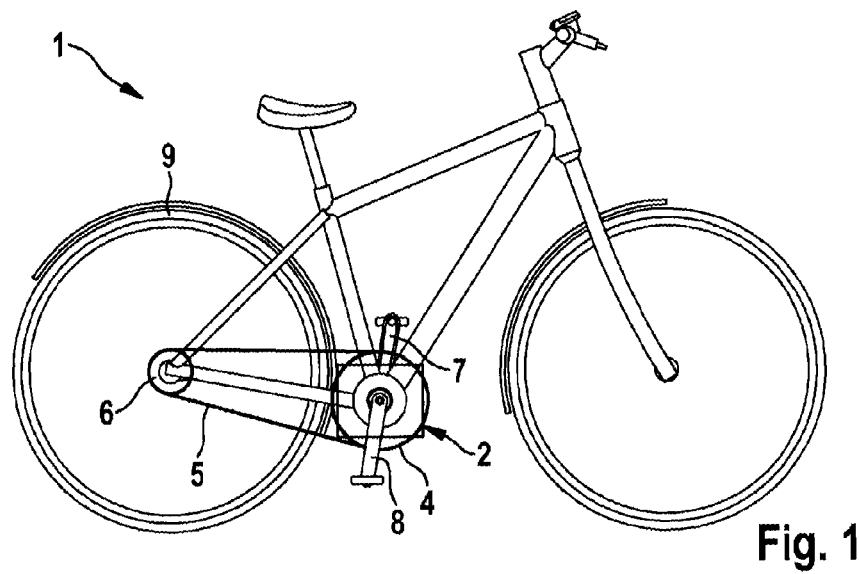
FIG. 1 shows a schematic illustration of an electric bicycle according to a first exemplary embodiment of the present invention.

As can be gathered from FIG. 1, electric bicycle 1 includes a crankshaft drive 2, into which an electric drive 3 (see FIG. 2) is integrated. Via a chain 5, chain ring 4 outputs a drive force to a pinion 6 situated on a rear wheel 9. Reference numerals 7 and 8 denote cranks including pedals of the electric bicycle.

Figure 2:
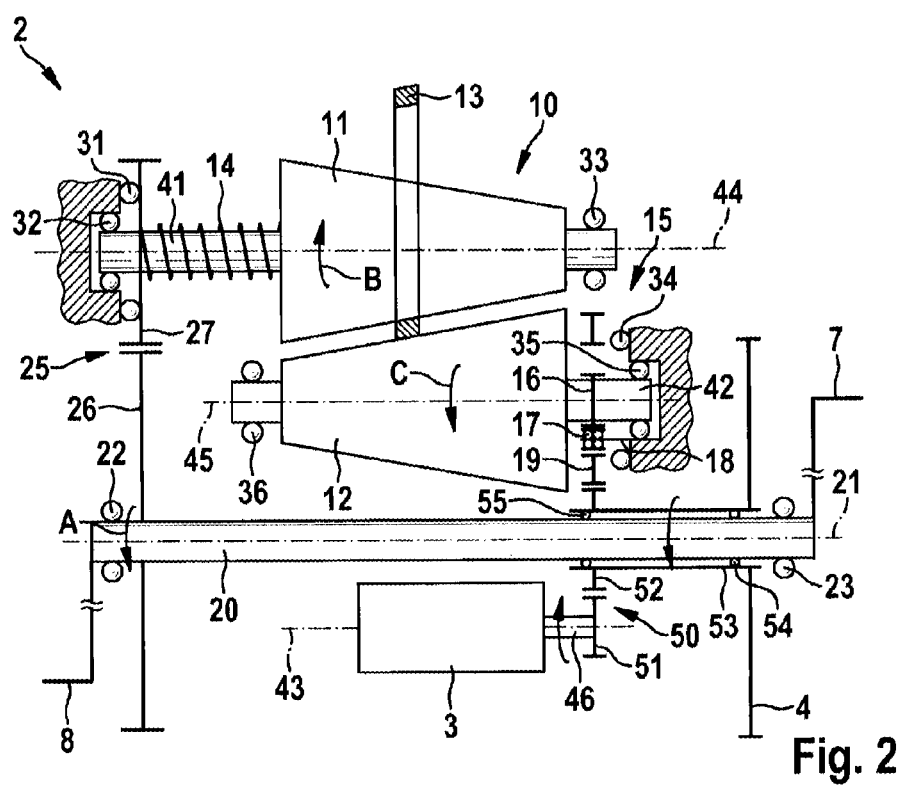
FIG. 2 shows a schematic view of a crankshaft drive of an electric bicycle according to the first exemplary embodiment of the present invention.

FIG. 2 shows crankshaft drive 2 in detail. Crankshaft drive 2 not only has the two cranks 7, 8, but also a bottom bracket spindle 20, which is supported on a first bottom bracket 22 and a second bottom bracket 23. A pedaling force generated by a rider is transmitted via the pedals to bottom bracket spindle 20. A rotation of the bottom bracket spindle is denoted by arrow A.

A first toothed wheel 26, which meshes with a second toothed wheel 27, is situated on bottom bracket spindle 20. The two toothed wheels 26, 27 form a first gear step 25. Second toothed wheel 27 is disposed on an input shaft 41 of a cone ring transmission 10.

In addition to input shaft 41, cone ring transmission 10 includes an input cone 11, an output cone 12, and a cone ring 13 situated between the input cone and the output cone. A cone pretensioning mechanism 14 having a spring is provided for pretensioning the cone ring transmission in the axial direction. A rotation of input cone 11 is indicated by arrow B, and a rotation of output cone 12 is indicated by arrow C. Output cone 12 is situated on an output shaft 42, and input shaft 41 runs parallel to output shaft 42, as shown in FIG. 2. Reference numeral 44 denotes an axis of the input shaft, and reference numeral 45, an axis of the output shaft.

Input shaft 41 is supported on a first axial bearing 31 as well as a first radial bearing 32 and a second radial bearing 33. Output shaft 42 is supported on a second axial bearing 34, a third radial bearing 35 and a fourth radial bearing 36.

Electric drive 3 has a motor output shaft 46, on which a motor pinion 51 is situated. Motor pinion 51 is part of a second gear step 50, which also includes a driven toothed wheel 52. Driven toothed wheel 52 is situated on a sleeve 53, on which chain ring 4 is disposed as well. Sleeve 53 is supported on a bottom bracket spindle 20 via a first freewheel bearing 54 and a second freewheel bearing 55. A motor axis is denoted by reference numeral 43.

In addition, electric bicycle 1 includes a planetary gearing 15. Planetary gearing 15 is connected to cone transmission 10 on the one side, and to second gear step 50 on the other. More specifically, planetary gearing 15 includes a sun gear 16, a plurality of planetary wheels 17, a planetary carrier 18, and a ring gear 19. Planetary carrier 18 is immovable. In addition to the usual internal gearing, ring gear 19 has an outer gearing. Sun gear 16 is situated on output shaft 42 of cone ring transmission 10. Sun gear 16 meshes with planetary wheels 17, which in turn mesh with ring gear 19. The external gearing of ring gear 19 is in engagement with driven toothed wheel 52 of second gear step 50.

As a result, both the torque generated by electric motor 3 (if driven) and the torque generated by the rider are routed via cone ring transmission 10 to driven toothed wheel 52 of second gear step 50. Via sleeve 53 and chain ring 4, the torque is transmitted to chain 5 and to pinion 6 on the rear wheel.

Cone ring transmission 10 assumes the function of a gear shift device, so that no additional gear shift mechanism has to be provided on the rear wheel in the area of pinion 6. A variation of the translation on the cone ring transmission is implemented by moving cone ring 13 in the axial direction, which can be done with the aid of an electric actuator, for example.

A connection of input cone 11 to input shaft 41 or of output cone 12 to output shaft 42 may be realized via an adjusting spring link or a splined shaft. This ensures the axial mobility of the cones within a certain range.

In order to achieve the lowest possible slip, cone ring 13 is preferably developed in spherical form in relation to the cones. This also leads to an improved lubricant supply, since a capillary gap is obtained thereby between cone ring 13 and the lateral surfaces of the cones.

If a rider then operates the pedals, the torque is input via first gear step 25 into cone ring transmission 10. Here, a step-up ratio or a step-down ratio set according to the rider's wishes takes place, and the torque varied in this manner is input into planetary gearing 15. Planetary gearing 15 then forwards the changed torque via driven toothed wheel 52 of second gear step 50 to chain ring 4. In addition or also only exclusively, it is also possible to operate electric drive 3, whose torque is likewise transmitted to chain ring 4 via second gear step 50.

According to the invention, it is therefore possible to place both a gear shift mechanism and an electric drive on crankshaft drive 2. Electric drive 3 and the gear shift mechanism, developed as cone ring transmission, are preferably disposed in a shared housing of crankshaft drive 2. As can be gathered from FIG. 2, cone ring transmission 10 is situated above bottom bracket spindle 20, and electric drive 3 is disposed underneath bottom bracket spindle 20. Cone ring transmission 10 is able to provide a continuous translation of a rider-applied torque, which allows an especially satisfactory interplay between the torque applied by the rider and the torque supplied by electric drive 3. More specifically, cone ring transmission 10 also allows a variation of the translation under load, so that even in a change of a translation, electric drive 3 is able to be driven continuously, if desired, and can supply additional torque for an accelerative force.

Figure 3:
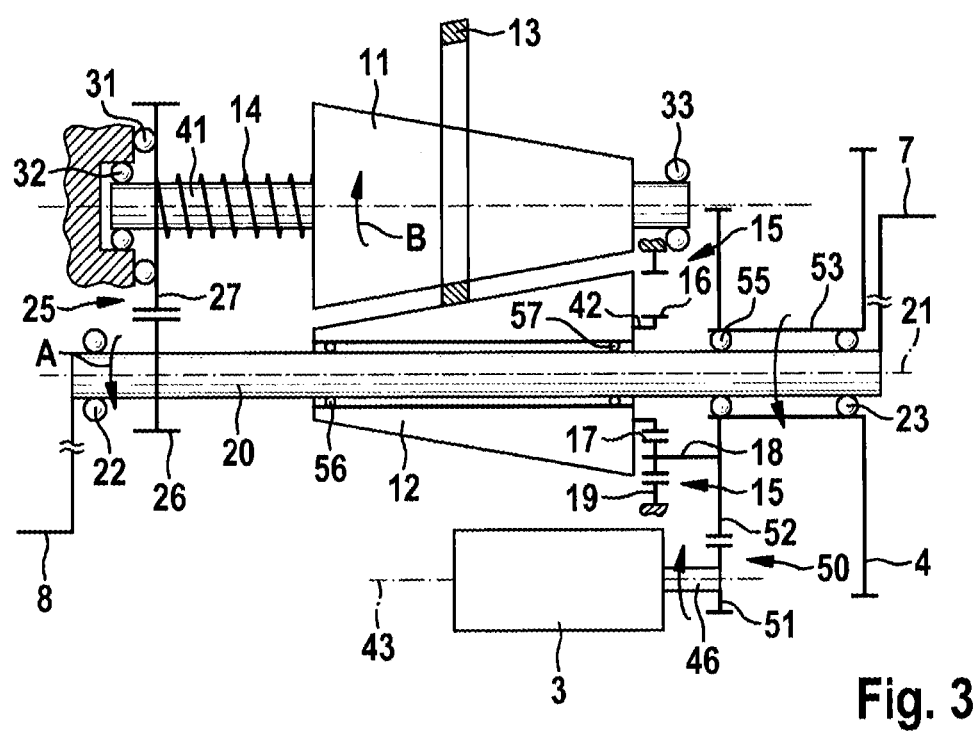
FIG. 3 shows a schematic view of a crankshaft drive of an electric bicycle according to a second exemplary embodiment of the present invention.

FIG. 3 shows a crankshaft drive according to a second exemplary embodiment of the present invention, in which, in contrast to the first exemplary embodiment, bottom bracket spindle 20 is situated in one of the cones of cone ring transmission 10. More specifically, bottom bracket spindle 20 is disposed in output cone 12 of the cone ring transmission. In this way the axis of the bottom bracket spindle and the axis of output cone 12 coincide. The electric bicycle of the second exemplary embodiment also includes a planetary gearing 15, the output of planetary gear 15 in the secondary exemplary embodiment being realized via planetary carrier 18. As can be gathered from FIG. 3, planetary carrier 18 is connected to driven toothed wheel 52 of second gear step 50. This design of the crankshaft drive provides an even more compact solution for integrating cone ring transmission 10 and electric drive 3 into crankshaft drive 2 of the bicycle. Output cone 12 is supported on bottom bracket spindle 20 via two freewheel bearings 56, 57.

Figure 4:
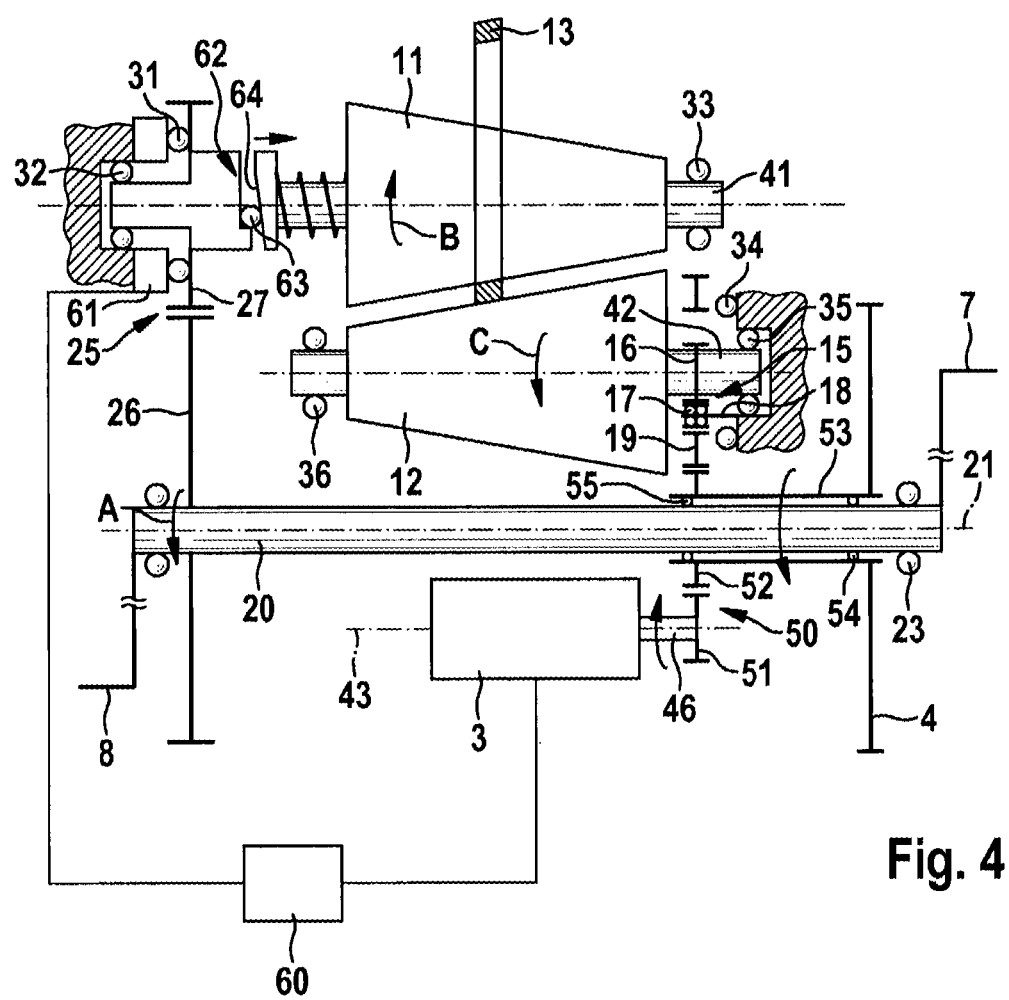
FIG. 4 shows a schematic view of a crankshaft drive of an electric bicycle according to a third exemplary embodiment of the present invention.

FIG. 4 shows a crankshaft drive 2 for an electric bicycle according to a third exemplary embodiment of the present invention, which essentially corresponds to the first exemplary embodiment. In contrast thereto, a sensor 61 for detecting a force applied by a rider via cranks 7, 8 is provided in addition in the third exemplary embodiment. Sensor 61 is disposed upstream from cone ring transmission 10 in the direction of the force flow. It is clear from FIG. 4 that a pressure mechanism 62 is provided between second toothed wheel 27 of first gear step 25 and input shaft 41 of input cone 11. Pressure mechanism 62 in this exemplary embodiment includes a ball 63, which runs on a sloping plane 64 disposed at input shaft 41. As a result, a pedal force measurement is possible via pressure mechanism 62 with the aid of force sensor 61. Force sensor 61 is connected to a control unit 60, which is designed to actuate electric drive 3 based on the values acquired by sensor 61. This allows an optimal actuation of electric drive 3 as a function of a pedal force applied by a rider and a rider-desired support by electric drive 3. In addition, the pedal force applied by the rider is used for pretensioning cone ring transmission 10, more precisely, input cone 11, in the axial direction, in addition to an existing spring 63.

Figure 5:
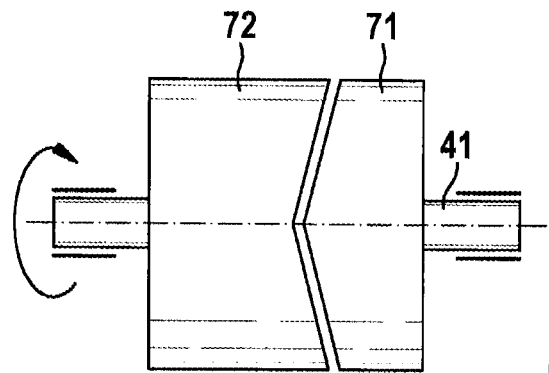
FIGS. 5 and 6 show schematic views of alternative cone pretensioning mechanisms.
Figure 6:
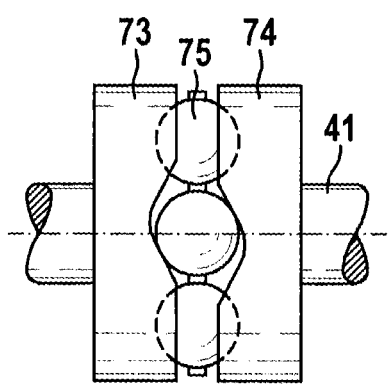

FIGS. 5 and 6 also show two alternative developments for pressure mechanism 62. FIG. 5 illustrates one development which features a positive cone 71 and a negative cone 72. FIG. 6 shows an alternative pressure mechanism 62, which includes a first disk 73, a second disk 74, and a multitude of balls 75, which are situated between the two disks 73, 74. Balls 75 lie partially inside pockets provided in the two disks 73, 74.

What is claimed is:

1. A vehicle which is operable using at least one of motor power and pedaling power, comprising:
    a crankshaft drive having a bottom bracket spindle;
    a chain ring that outputs a drive torque for the vehicle to a chain;
    an electric drive; and
    a cone ring transmission for a continuous variation of a translation ratio, wherein:
        the cone ring transmission and the electric drive are situated on the crankshaft drive, and
        the cone ring transmission is connected to the crankshaft drive and set up in such a way that a torque generated by a rider is transmitted to the chain ring.

2. The vehicle as recited in claim 1, wherein the vehicle is an electric bicycle.

3. The vehicle as recited in claim 1, wherein the cone ring transmission is situated within a housing of the crankshaft drive.

4. The vehicle as recited in claim 1, wherein the electric drive drives the chain ring via a gear step.

5. The vehicle as recited in claim 1, further comprising a planetary gearing situated between a driven shaft of the cone ring transmission and the chain ring.

6. The vehicle as recited in claim 1, wherein a gear ratio of the cone ring transmission is variable.

7. The vehicle as recited in claim 1, wherein the bottom bracket spindle runs through one of a plurality of cones of the cone ring transmission.

8. The vehicle as recited in claim 1, wherein the bottom bracket spindle runs through an output cone of the cone ring transmission.

9. The vehicle as recited in claim 1, further comprising:
    a control unit; and
    a sensor for recording a force that is applied by a rider, wherein the control unit controls the electric drive based on a force value recorded by the sensor.

10. The vehicle as recited in claim 9, further comprising:
    a cone pretensioning mechanism that pretensions one of a plurality of cones of the cone ring transmission in an axial direction of the cone; and
    a pressure mechanism situated on the cone pretensioning mechanism, wherein the sensor is situated on the pressure mechanism.

11. The vehicle as recited in claim 10, wherein the pressure mechanism includes one of:
    a sloped plane having a ball,
    a cone system having a positive cone and a negative cone, and
    a system of two disks having pockets, in which balls are situated.

12. The vehicle as recited in claim 1, wherein at least one of:
    the cone ring transmission is situated above the bottom bracket spindle, and
    the electric drive is situated underneath the bottom bracket spindle.

* * * * *